United States Patent [19]

Matsuda

[11] Patent Number: 4,809,182
[45] Date of Patent: Feb. 28, 1989

[54] ANTI-SKID BRAKE CONTROL SYSTEM WITH SIMULTANEOUS LOCKING PREVENTIVE FEATURE

[75] Inventor: Toshiro Matsuda, Sagamihara, Japan

[73] Assignee: Nissan Motor Company, Limited, Yokohama, Japan

[21] Appl. No.: 945,562

[22] Filed: Dec. 23, 1986

[30] Foreign Application Priority Data

Dec. 23, 1985 [JP] Japan .................................. 60-287676

[51] Int. Cl.[4] .............................................. B60T 8/34
[52] U.S. Cl. .................................. 364/426.02; 303/95; 303/110
[58] Field of Search .......................... 364/426; 180/197; 361/238; 303/95, 103, 110

[56] References Cited

U.S. PATENT DOCUMENTS

| 4,313,166 | 1/1982 | Rode et al. | 364/426 |
| 4,320,459 | 3/1982 | Lindemann et al. | 364/426 |
| 4,349,876 | 9/1982 | Lindemann | 364/426 |
| 4,435,768 | 3/1984 | Arikawa | 364/426 |
| 4,486,839 | 12/1984 | Mazur et al. | 364/426 |

FOREIGN PATENT DOCUMENTS 41-17082 9/1965 Japan .
2154763 9/1985 United Kingdom .
2154765 9/1985 United Kingdom .

Primary Examiner—Gary Chin
Attorney, Agent, or Firm—Foley & Lardner, Schwartz, Jeffery, Schwaab, Mack, Blumenthal & Evans

[57] ABSTRACT

An anti-skid brake control system, detects braking condition on at least two wheels for detecting synchronous braking condition in the wheels. Increasing of braking fluid pressure in one wheel cylinder associated with one of the wheels is disabled with respect to the brake fluid pressure increasing timing of the other wheel cylinder associated with the other wheel until the wheel associated with the other wheel cylinder is placed at non-locking stage. By delaying increasing of the braking pressure, the braking fluid pressure in one of the wheel cylinder is maintained lower than that in the other. Therefore, when one of the wheel, for which higher braking pressure is applied through the associated wheel cylinder, the other wheel is maintained at non-locking state. Therefore, the wheel speed closely reflects the actual vehicle speed.

6 Claims, 14 Drawing Sheets

ANTI-SKID BRAKE CONTROL SYSTEM WITH SIMULTANEOUS LOCKING PREVENTIVE FEATURE

BACKGROUND OF THE INVENTION

The present invention relates generally to an anti-skid brake control system for an automotive vehicle. More particularly, the invention relates generally to an anti-skid brake control system, in which a vehicle speed representing value is derived on the basis of a wheel speed. Further, the invention relates generally to an anti-skid brake control system which prevents all of the wheels from locking simultaneously and whereby assures derivation of the vehicle speed representing value precisely corresponding to an actual vehicle speed for assuring accurate brake control even on substantially slippery road condition.

Description of the Prior Art

As is well known, wheel slip control, such as anti-skid brake control and traction control which controls driving torque on vehicular wheels for eliminating wheel-spin, is performed generally based on a wheel slippage. The wheel slippage is generally derived on the basis of a difference between a wheel rotation speed and a vehicle speed. Namely, anti-skid brake control is carried out to maintain wheel slippage around 10 to 20% for optimizing vehicular braking control, wheel-spinning condition is detected by detecting wheel speed exceeding a vehicle speed representative value.

Therefore, in order to perform precise wheel slip control, it is essential to detect vehicle speed accurately. Substantially high accuracy of vehicle speed detection can be made by means of known lader systems, such as a dopper lader system. However, such lader systems are expensive for facilitating wheel slip control. Therefore, in practice, the vehicle speed representing value has to be derived based on other parameter which can be obtained in an inexpensive sensor or sensors.

Conventionally, the vehicle speed representing values have been derived on the basis of rotation speeds of vehicular wheels. For example, the Japanese Patent Second (examined) Publication (Tokko) Showa No. 41-17082 discloses an anti-skid brake control system with derivation of the vehicle speed representing value. In the disclosed procedure, one of the wheels rotating at the highest speed is selected to take the rotation speed thereof for deriving the vehicle speed representing value. However, during abrupt deceleration of the vehicle, even the wheel speed of the highest speed wheel will not represent the vehicle speed. Therefore, in the conventionally, the vehicle speed representing value may be arithmetically derived by latching a highest wheel speed upon initiation of one cycle of wheel slip control operation and decreasing a constant value at every given interval for deriving assumed vehicle speed representing values to be used during abrupt deceleration.

Difficulty arises in performing accurate or precise anti-skid brake control when all of wheels cause wheel-locking to abruptly drop the wheel speed. When all of the wheels are locked and skidding. the vehicle speed representing value derived based on the highest wheel speed value becomes completely useless, since that value will not represent the vehicle speed. In order to avoid this, there is one approach to be taken to provide a back-up value which is to be used as vehicle speed representing value while all the wheels are skidding. In such a system, locking of all the wheels has to be detected in a precise manner so as to assure switching of the use of the vehicle speed representing value derived based on the highest wheel speed and the back-up value. However, difficulty is encountered in detecting all wheel locking. Particularly, when the anti-skid control is utilized for a four wheel drive vehicle and all of the wheels are connected to the engine, inertia momentum exerted onto each wheel becomes relatively too high to slow-down the decrease of the wheel speed.

SUMMARY OF THE INVENTION

Therefore, it is an object of the present invention to provide an anti-skid brake control system which successfully prevents all of wheels from locking simultaneously.

Another object of the present invention is to provide an anti-skid brake control system which can initiate anti-skid brake control before all of the wheels are locked during abrupt braking.

In order to accomplish the aforementioned and other objects, an anti-skid brake control system, according to the present invention, detects braking condition on at least two wheels for detecting synchronous braking condition in the wheels. Increasing the braking fluid pressure in one wheel cylinder associated with one of the wheels is disabled with respect to the brake fluid pressure increasing timing of the other wheel cylinder associated with the other wheel until the wheel associated with the- other wheel cylinder is placed at a non-locking state. By delaying increasing of the braking pressure, the braking fluid pressure in one of the wheel cylinder is maintained lower than that in the other. Therefore, when one of the wheels, for which higher braking pressure is applied through the associated wheel cylinder, the other wheel is maintained at a non-locking state. Therefore, the wheel speed closely reflects the actual vehicle speed.

This assures accurate brake control in the anti-skid brake control for the automotive vehicle utilizing the vehicle speed representing value derived based on the rotation speed of the non-locking wheel.

According to one aspect of the invention, an anti-skid brake control system for an automotive vehicle comprises a hydraulic brake circuit including a plurality of wheel cylinders for establishing braking pressure for decelerating vehicular wheels, first and second anti-skid brake control valves, each associated with at least one of first and second wheel cylinders associated with first and second wheels for adjusting braking pressure therein, each of the anti-skid brake control valves being operable to increase braking pressure in the associated wheel cylinder in a first mode position, and to decrease the braking pressure in the associated wheel cylinder in a second mode position, first sensor for monitoring rotation speed of the first wheel for producing a first wheel speed indicative signal, second sensor for monitoring rotation speed of the second wheel for producing a second wheel speed indicative signal, first means for deriving first control signal for controlling position of the first anti-skid brake control valve based on the first wheel speed indicative signal between the first and second mode positions, second means for deriving second control signal for controlling position of the second anti-skid brake control valve based on the second wheel speed indicative signal between the first and second mode positions, and third means for detecting synchronous operation of the first and second anti-skid brake control valves to produce a third control signal for disabling one of the first and second means to operate associated one of the first and second anti-skid brake control valves into the first mode position and to allow the other of the first and second means to operate the associated one of first and second anti-skid brake control valves into the first mode position, the third means holding the one of the first and second means in the disabled state until braking condition of one of the wheel to be controlled by the other of the first and second anti-skid brake control valve satisfies a predetermined condition which reflects non-locking state of the one wheel.

The anti-skid brake control valves are further operable to hold the braking pressure in the first and second wheel cylinders constant in third mode position. The first and second means alternatively switch the mode positions of the first and second anti-skid brake control valves between the first and third mode positions so as to increase the braking pressure in the first and second wheel cylinders in stepwise fashion. The third means includes first counter for incrementing counter value by a value proportional to a period of time to maintain the first anti-skid brake control valve at the first mode position and a second counter for increasing the counter value by a value proportional to a period of time to maintain the second anti-skid brake control valve at the first mode position, and detector for detecting synchronously increasing of braking pressure in the first and second wheel cylinders by comparing a difference of the counter values of the first and second counters with a given value.

The anti-skid brake control system further comprises first arithmetic means for deriving first wheel acceleration based on the first wheel speed indicative signal to produce a first wheel acceleration indicative signal, a second arithmetic circuit for deriving second wheel acceleration based on the second wheel speed indicative signal value to produce a second wheel acceleration indicative signal, a first peak hold circuit for holding peak value of the first wheel acceleration indicative signal in each skid cycle, and a second peak hold circuit for holding peak value of the second wheel speed indicative signal in each skid cycle. The third means further includes a first comparator for comparing the first counter value with a first reference value derived based on the peak value for producing a first comparator signal when the first counter value is greater than or equal to the first reference value, and a second comparator for comparing the second counter value with a second reference value derived based on the peak value for producing a second comparator signal when the second counter value is greater than or equal to the second reference value, and the third means is responsive to the first and second comparator signals under the presence of the detector signal to control operation of the first and second anti-skid brake control valve with the delay time.

DESCRIPTION OF THE PREFERRED EMBODIMENT

Figure 1A:
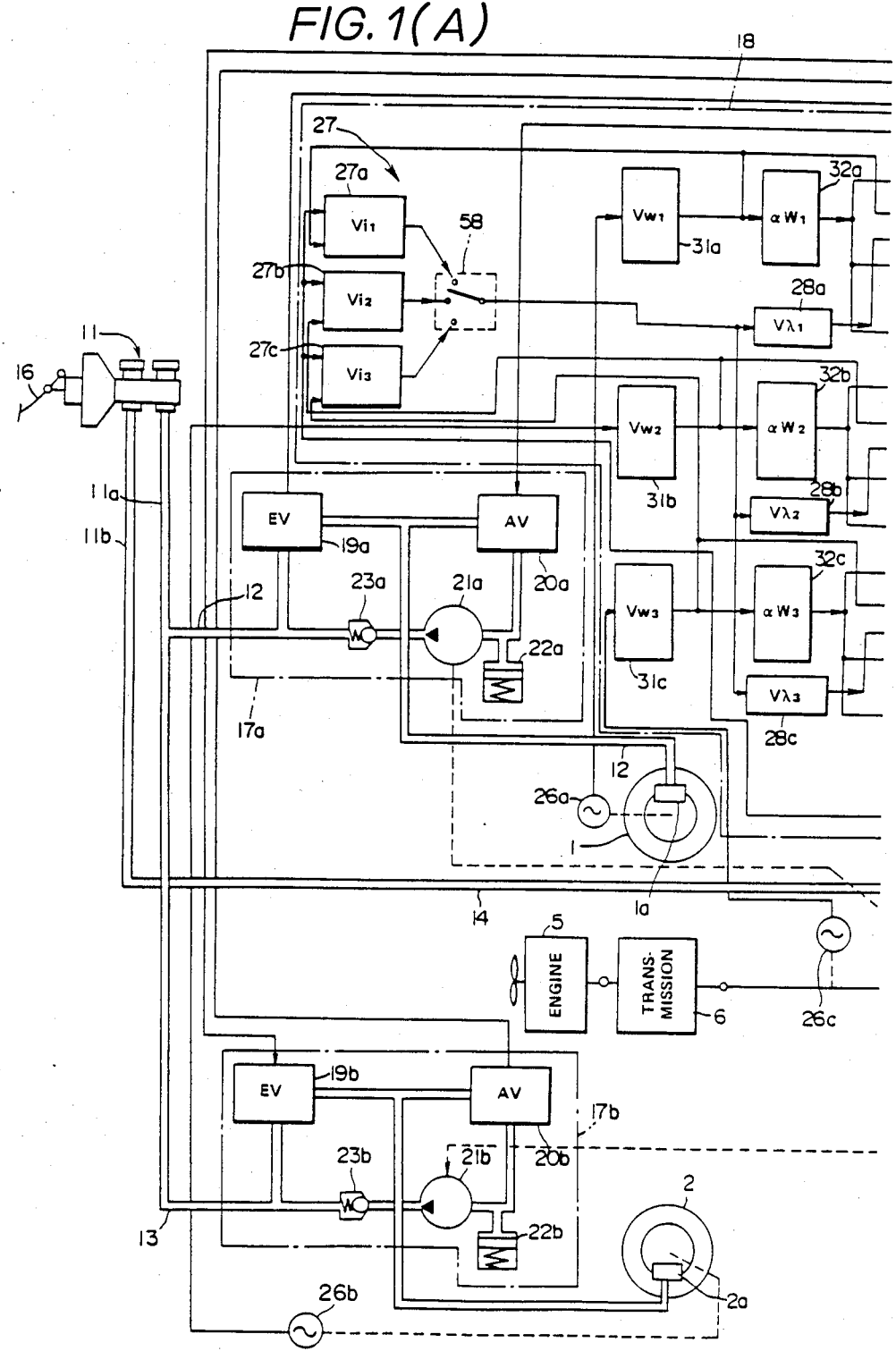
FIGS. 1(A) and 1(B) are block diagram of an overall wheel slip control system, to which the preferred embodiment of a vehicle speed representing value derivation system according to the invention, is applied.
Figure 1B:
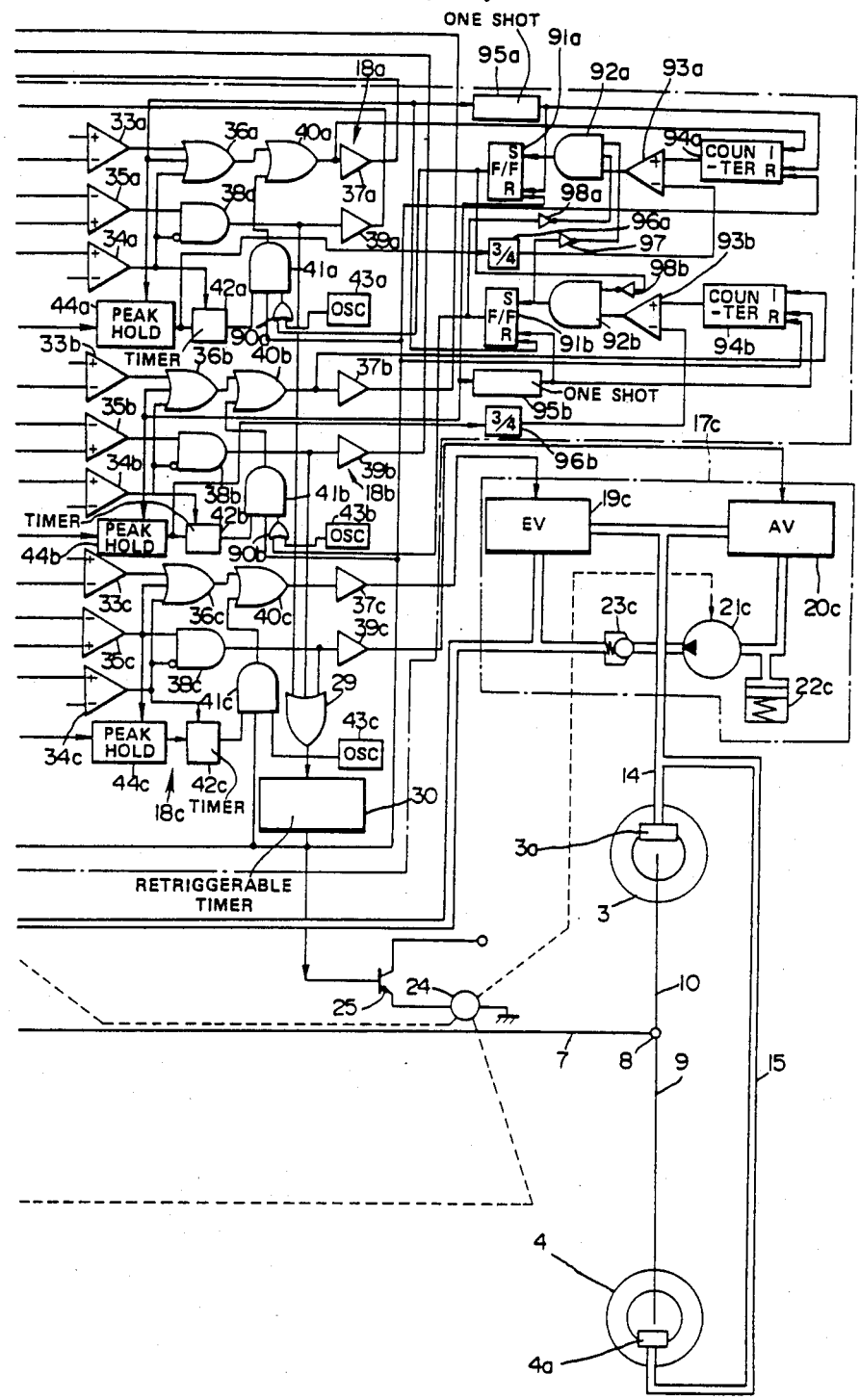

Referring now to the drawings, particularly to FIG. 1, a wheel slip control system is designed for controlling wheel slip at respective front and rear wheels 1, 2, 3 and 4. Each front and rear wheels 1, 2, 3 and 4 are co-operated with wheel cylinders 1a, 2a, 3a and 4a so as to apply braking force therethrough. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the wheel slip control system controls braking force to be exerted to each of the wheel cylinders for performing anti-skid brake control for preventing the wheels from skidding. On the other hand, the wheel slip control system controls engine output torque or driving torque distribution to the driven rear wheels 3 and 4 so as to prevent the wheels from causing wheel-spin and to provide better tire road traction. The engine output torque control or power distribution control may be performed by adjusting throttle valve angular position by means of a throttle valve servo systems, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474, filed on Sept. 4, 1986, now U.S. Pat. No. 4,718,139, issued Jan. 12, 1988, assigned to the common assignee to the present invention. The disclosure of the above-identified co-pending U.S. patent application is also herein incorporated by reference for the sake of disclosure.

In the shown embodiment, a hydraulic brake system for applying braking fluid pressure to respective wheel cylinders 1a, 2a, 3a and 4a includes separate two hydraulic circuits 12 and 14. One of the circuits 12 connects one of the outlet ports of a master cylinder 11 to the front-right wheel cylinder 1a which is associated with the front-right wheel 1. The circuit 12 includes a branch circuit 13 connecting one of the outlet ports to the front-left wheel cylinder 2a of the front-left wheel 2. The other outlet port of the master cylinder 11 is connected to the rear-right wheel cylinder 3a and, through a branch circuit to the rear-left wheel cylinder 4a. As is well known, the master cylinder 11 is mechanically coupled with a brake pedal 16 for building-up braking fluid pressure depending upon the magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a and 17b and 17c are disposed in the circuits 12, 13 and 14. As will be seen from FIG. 1(A) and 1(B), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13. Therefore, the valves 17a and 17b controls braking fluid pressures at associated one of the wheel cylinders 1a and 2a, independently of each other.

The anti-skid brake control valve assemblies 17a, 17b and 17c have mutually identical constructions to each other. Therefore, it would not be necessary to give a detailed description of the constructions for the valve assemblies 17a, 17b and 17c, respectively. In order to avoid redundant recitation and avoiding to avoid confusion in understanding the invention, the construction of the anti-skid brake control valve assembly 17a will only be described hereinbelow. The constructions of the valve assemblies 17b and 17c should be understood as identical to that of the valve assembly 17a set out below.

The anti-skid brake control valve assembly 17a includes an inlet (EV) valve 19a, outlet (AV) valve 20a, a fluid pump 21a, accumulator 22a and one-way check valve 23a. The inlet valve 19a has an inlet port connected to the associated outlet port of the master cylinder 11 via the hydraulic circuit 12 and an outlet port connected to the front-right wheel cylinder 1a. On the other hand, the AV valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The EV valve 19a valve position is controlled by an inlet control signal $EV_1$ from a control unit 18 between closed position and open position. Similarly, the AV valve 20a valve position is controlled the valve by an outlet control signal $AV_1$ from the control unit 18 between a closed position and an open position. Furthermore, the fluid pump 21a is connected to the control unit 18 to receive a pump drive signal MR, its operation is controlled between driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR turns into HIGH to drive the fluid pump 21. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a is blocked from fluid communication with the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|  | APPLICATION | RELEASE | HOLD |
|---|---|---|---|
| $EV_1$ | LOW | HIGH | HIGH |
| $AV_1$ | LOW | LOW | HIGH |
| MR | — | — | HIGH |

The control unit 18 is connected to a wheel speed sensor 26a for receiving pulse signals having frequency proportional to the rotation speed of the associated wheel 1. In practice, the wheel speed sensor 26 comprises a sensor rotor adapted to rotate with the vehicle wheel and a sensor assembly fixedly secured to the shim portion of the knuckle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with a north pole near the sensor rotor and south pole distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect a variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

The control unit 18 has a controller circuit section 18a for performing wheel slip control for the right-front wheel 1. Similarly, the control unit 18 has controller circuit sections 18b and 18c respectively adapted to perform wheel slip control for respectively associated left-front wheel 2 and rear wheels 3 and 4. The controller circuit section 18a receives the wheel speed indicative pulse signal from the wheel speed sensor 26a. Similarly, the controller circuit section 18b receives a wheel speed indicative pulse signal from a wheel speed sensor 26b which monitors rotation speed of the left-front wheel 2. A wheel speed sensor 26c is connected to the controller circuit section 18c for inputting wheel speed indicative pulse signal, which monitors average rotation speed of the rear wheels 3 and 4. In order to monitor the average speed of the rear wheels, the wheel speed sensor 26c is coupled with the propeller shaft 7 for monitoring rotation speed thereof as the averation rotation speed of the rear wheels. As the anti-skid brake control valves 17a, 17b and 17c, the controller circuit sections 18a, 18b and 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIG. 1, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ based on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown) which generates an acceleration threshold indicative reference signal having a value indicative of a predetermined wheel acceleration threshold $+a$. The comparator 34a thus compares the wheel acceleration $\alpha w_1$ as indicated in the wheel acceleration indicative signal of the wheel acceleration derivation circuit 32a with the wheel acceleration threshold $+a$. The comparator 34a generally outputs a LOW level comparator signal while the wheel acceleration $\alpha w_1$ is held lower than the wheel acceleration threshold $+a$. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi and a desired optimum wheel slippage for optimizing vehicular braking efficiency. As is well known, the vehicular braking efficiency becomes maximum in a wheel slippage range of 10% to 20%. In the practical embodiment, the target wheel slippage λ is set at 15%. On the other hand, the vehicle speed representing value Vi is derived on the basis of an instantaneous wheel speed Vw at the beginning of each cycle of anti-skid brake control. The procedure of derivation of the vehicle speed representing value Vi discussed later. The target wheel speed Vλ is derived at a value of 85% of the vehicle speed representing value Vi to indicate 15% of wheel slippage. The comparator 35a maintains a LOW level comparator signal while the wheel speed Vw is maintained higher than the target wheel speed Vλ. On the other hand, the comparator signal level of the comparator 35a turns HIGH when the wheel speed Vw drops across the target wheel speed Vλ.

The comparator signals of the comparators 33a and 34a and 35a are fed to input terminals of an OR gate 36. The comparator 34a and 35a are also connected to an AND gate 38 to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to the output terminal of an OR gate 90a. The OR gate 90a has one input terminal connected to a flip-flop 91a of a synchronous locking detector circuit, which flip-flop 91a serves as delay circuit for providing delay to operate the anti-skid brake control valve 17a into the APPLICATION mode. Operation of the timer 91 and the associated circuit thereof will be described in detail later. The other input terminal of the OR gate 90a is connected to an oscillator 43a which serves as a clock generator. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

A vehicle speed representing value derivation circuit 27a is connected to the wheel speed derivation circuit 31a to receive therefrom the wheel speed signal from time-to-time. The vehicle speed representing value derivation circuit 27a is also connected to the retriggerable timer circuit 30. The vehicle speed representing value derivation circuit 27a is designed to latch an instantaneous wheel speed Vw as an initial vehicle speed representing value $Vi_1$ in response to the leading edge of a HIGH level timer signal serving as the pump drive signal MR. The vehicle speed representing value derivation circuit 27a derives the vehicle speed representing value $Vi_1$ on the basis of the initial vehicle speed representing value corresponding to the latched wheel speed value $Vw_1$ as set forth above.

The vehicle speed representing value derivation circuit 27a is associated with other vehicle speed representing value derivation circuits 27b and 27c which derive the vehicle speed representing values $Vi_2$ and $Vi_3$ with respect to respectively associated left front wheel 2 and rear wheels 3 and 4, in order to form the preferred embodiment of a vehicle speed representing value derivation system 27. The vehicle speed representing value derivation system 27 also includes a select LOW switch 58 having three terminals respectively connected to the vehicle speed representing value derivation circuits 27a, 27b and 27c. The select-LOW switch 58 selects the smallest value among three vehicle speed representing values $Vi_1$, $Vi_2$ and $Vi_2$ from respective vehicle speed representing value derivation circuits 27a, 27b and 27c and outputs the selected value as a common vehicle speed representing value Vi. The common vehicle speed representing value Vi is transferred to respective target wheel speed derivation circuits 28a, 28b and 28c in the controller circuit sections 18a, 18b and 18c so that the target wheel derivation circuits will be able to derive the target wheel speeds $V\lambda_1$, $V\lambda_2$ and $V\lambda_3$ based thereon.

The preferred embodiment of the anti-skid brake control system, according to the present invention is adapted to prevent the front wheels, i.e. the right-front wheel 1 and the left-front wheel 2 from synchroneously locking. Therefore, the synchronous locking detector circuit is provided for detecting synchronous lock at right- and left front wheels 1 and 2. The synchronous lock detector circuit is thus associated with the controller circuit sections 18a and 18b. The synchronous lock detector circuit includes counters 94a and 94b. The counter 94a is connected to the output terminal of the OR gate 40a at input terminal. The counter 94b is triggered by LOW level gate signal from the OR gate 40a to count-up an internal clock for increasing the counter value thereof according to the length of period to maintain the anti-skid brake control valve 17a in APPLICATION mode. On the other hand, the counter 94a is connected to a shot pulse generator 95a to receive therefrom a rest pulse at its reset input terminal to clear the counter value in response to the reset pulse. The shot-pulse generator 95a is, in turn, connected to the output terminal of the comparator 35a to be triggered by the trailing edge of the HIGH level comparator signal therefrom. Similarly, the counter 94b is connected to the output terminal of the OR gate 40b at input terminal. The counter 94b is triggered by a LOW level gate signal from the OR gate 40b to count-up an internal clock for increasing the counter value thereof according to the length of the period to maintain the anti-skid brake control valve 17b in APPLICATION mode. On the other hand, the counter 94b is connected to a shot pulse generator 95b to receive therefrom a reset pulse at its reset input terminal to clear the counter value in response to the reset pulse. The shot-pulse generator 95b is, in turn, connected to the output terminal of the comparator 35b to be triggered by the trailing edge of the HIGH level comparator signal therefrom, connected to the AND gates 41a and 41b.

The counter 94a is connected to the non-inverting input terminal of a comparator 93a. The inverting input terminal of the comparator 93a is connected to the peak hold circuit 44a through a ¾ multiplier 96a to receive a ¾ multiplied peak value indicative signal. Similarly, the counter 94b is connected to the non-inverting input terminal of a comparator 93b and a subtracting circuit 100. The inverting input terminal of the comparator 93b is connected to the peak hold circuit 44a through a ¾ multiplier 96b to receive a ¾ multiplied peak value indicative signal.

The output terminal of the comparator 93a is connected to one input terminal Of an AND gate 92a. Another input terminal of the AND gate 92a is connected to the output terminal of the timer 91b via an inverter 98a. The other input terminal of the AND gate 92a is connected to the output terminal of an AND gate 92b. The AND gate 92a has an output terminal connected to the timer 91a via an inverter 97.

The output terminal of the comparator 93b is connected to one input terminal of an AND gate 92b. The other input terminal of the AND gate 92b is connected to the output terminal of the timer 91a via an inverter 98b.

Figure 2:
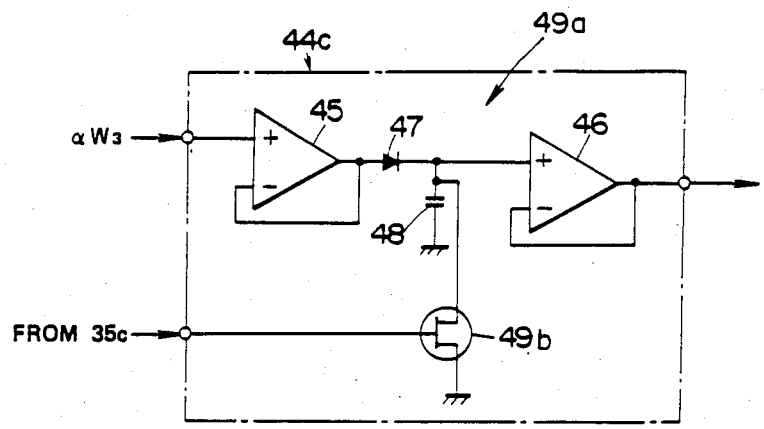
FIG. 2 is a circuit diagram of a peak detecting circuit in the wheel speed representing value derivation circuit of FIG. 1.

FIG. 2 shows detailed construction of the peak detector circuit 44a in the controller circuit section 18a set forth above. As will be seen from FIG. 2, the peak hold circuit 44a generally comprises a peak hold circuit 49a and an analog switch 49b. The peak hold circuit 48 is consisted of buffer amplifiers 45 and 46, a diode 47 and a capacitor 48. The buffer amplifier 45 of the peak hold circuit 49a is connected to the wheel acceleration derivation circuit 32a to receive therefrom the wheel acceleration indicative signal having a value representative of the wheel acceleration $\alpha w_1$, at a non-inverted input terminal. An inverting input terminal of the buffer amplifier 45 is connected to an output terminal thereof for receiving the amplifier output as feedback input. The buffer amplifier outputs through its output terminal the amplifier output indicative of one of the inputs greater than the other. The amplifier output of the buffer amplifier 45 is fed to a charge/discharge circuit consisting of the diode 47 and the capacitor 48 and to a non-inverted input terminal of the other buffer amplifier 46. Similarly to the aforementioned buffer amplifier 45, an inverting input terminal of the buffer amplifier 46 is connected to an output terminal thereof to receive the amplifier output as feedback input.

Figure 3:
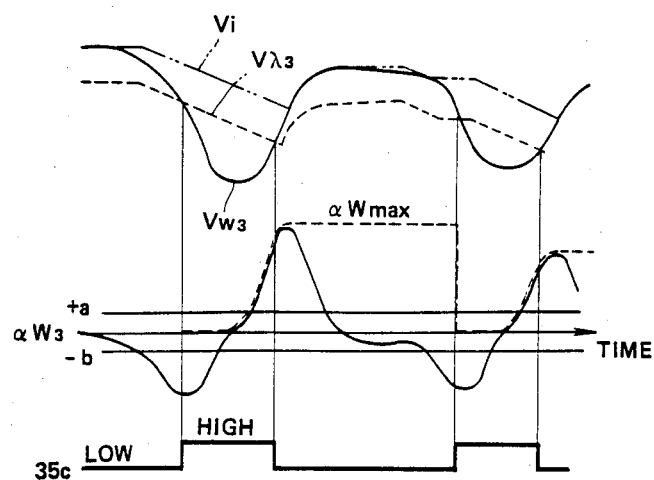
FIG. 3 is a chart showing manner of detection of the wheel speed peak to be carried out by the peak detecting circuit of FIG. 2.

The input side of the capacitor 48 is connected to the ground through the analog switch 49b. The analog switch 49b is connected to the comparator 33a. Therefore, the analog switch 49a becomes conductive at every leading edge of the HIGH level comparator signal from the comparator 33a for connecting the capacitor 48 to the ground. As a result, the potential in the capacitor 48 is discharged to the ground. Since the analog switch 49a is held conductive while the comparator signal from the comparator 33a is held at HIGH level, the potential in the capacitor 48 is maintained substantially zero during this period. The analog switch 49a becomes non-conductive in response to the trailing edge of the HIGH level comparator signal from the comparator 33a to block communication between the capacitor 48 and the ground. As a result, the capacitor 48 starts to be charged by the amplifier output from the buffer amplifier 45. The potential in the capacitor 48 is increased as increasing of the wheel acceleration $\alpha w_1$ and held at the value corresponding to the peak value of the wheel acceleration, as shown in FIG. 3. Therefore, the amplifier output from the buffer amplifier 46 indicates peak value $\alpha w_{max}$ of the wheel acceleration. As set forth above, since the potential in the capacitor 48 is discharged everytime the comparator signal rises to HIGH, the peak value $\alpha w_{max}$ output from the peak detector circuit 44a represents the peak value of the wheel acceleration $\alpha w_1$ in each skid cycle, while the anti-skid brake control is performed.

Figure 4:
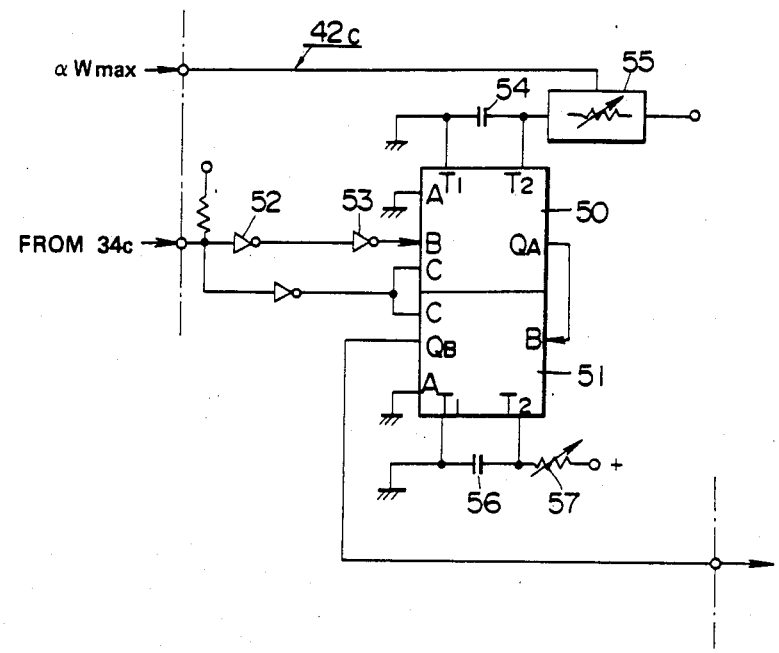
FIG. 4 is a circuit diagram of a variable timer circuit employed in the wheel slip control system of FIG. 1.

FIG. 4 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 5:
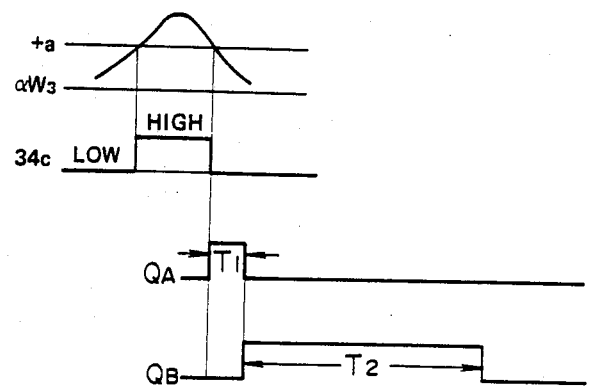
FIG. 5 is a chart showing operation of the variable timer circuit of FIG. 4.

The timer signal $Q_A$ of the first timer 50 is fed to a B input port of the second timer 51. The second timer 51 has a time constant circuit consisted of a capacitor 56 and a variable resistor 57 for providing a timer period $T_2$. The time constant of the time constant circuit of the capacitor 56 and the variable resistor 57 is set constant to set the timer period $T_2$ constant. Therefore, the second timer 51 is triggered by the trailing edge of the HIGH level input at the B input terminal. The second timer 51 as triggered outputs HIGH level timer signal for the timer period determined by the time constant of the time constant circuit of the capacitor 56 and the variable resistor 57, through $Q_B$ output terminal for the given period of time $T_2$, as shown in FIG. 5.

Figure 6:
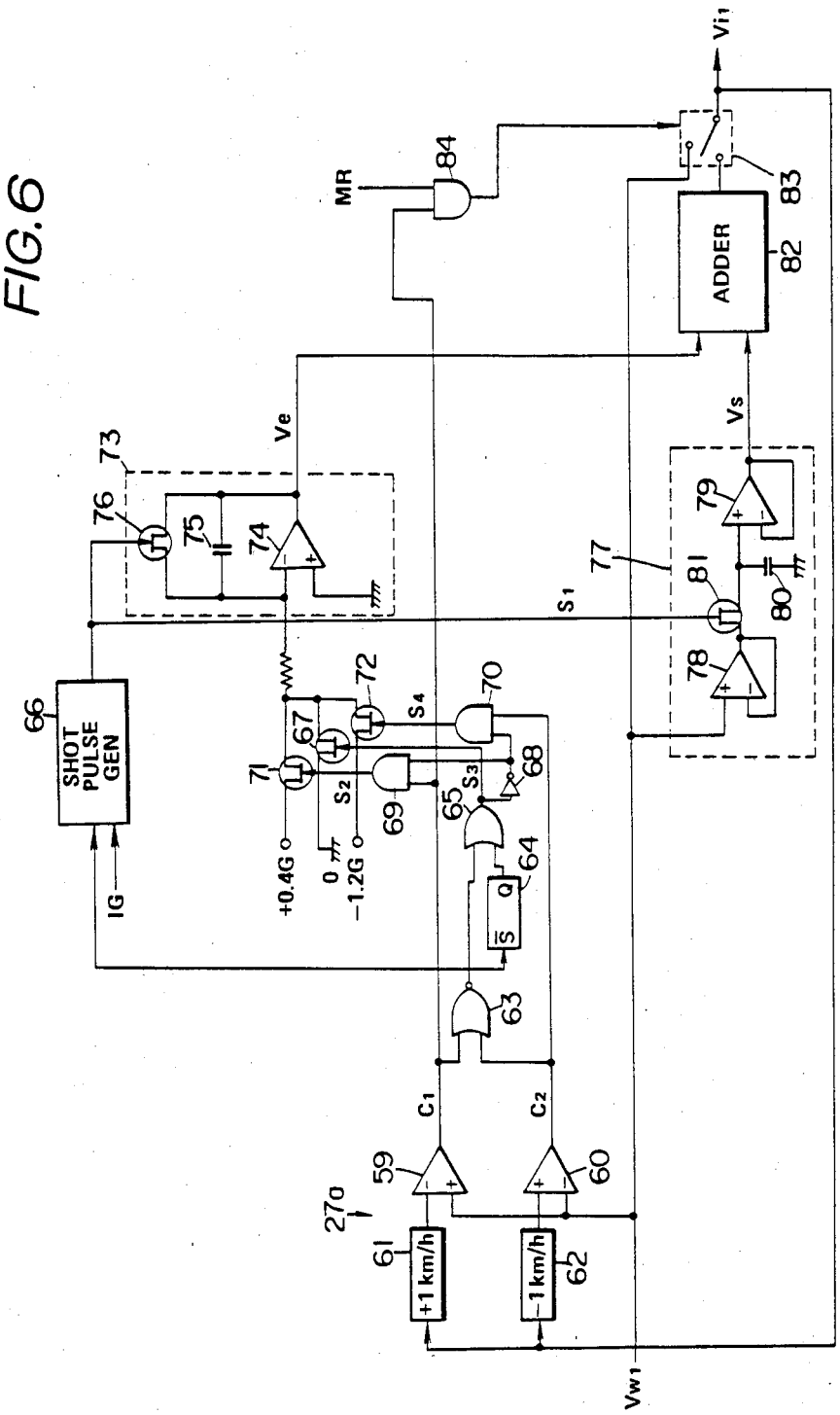
FIG. 6 is a block diagram of the preferred embodiment of the vehicle speed representing value derivation circuit in the wheel slip control system of FIG. 1.

FIG. 6 shows the detailed construction of the vehicle speed representing value derivation circuit 27a. As set forth above, the vehicle speed representing value derivation circuit 27a derives a vehicle speed representing vale $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing value derivation circuit 27a through a subtractor 62. The adder 61 is designed to add a given value corresponding to 1 km/h of vehicle speed to the vehicle speed representing value $Vi_1$ for providing dead band of $+1$ km/h. The value as the sum of the vehicle speed representing value $Vi_1$ and the dead band value 1 km/h will be hereafter referred to as higher vehicle speed reference value. Similarly, the subtractor 672 subtracts a given value corresponding to 1 km/h of the vehicle speed from the vehicle speed representing value $Vi_1$ for providing dead band of $-1$ km/h. The value as the difference of the vehicle speed representing value $Vi_1$ and the dead band value $-1$ km/h will be hereafter referred to as lower vehicle speed reference value. The comparator 59 outputs HIGH level comparator signal when the wheel speed $vw_1$ is higher than or equal to the higher vehicle speed reference value $(Vi_1+1$ km/h$)$. In other words, the comparator signal level of the comparator 59 is held LOW as long as the wheel speed $Vw_1$ is maintained lower than the lower vehicle speed reference value ($V_{i_1}+1$ km/h). The comparator 60 outputs HIGH level comparator signal when the wheel speed $v_{w_1}$ is lower than to the lower vehicle speed reference value ($V_{i_1}$ 1 km/h). In other words, the comparator signal level of the comparator 59 is held LOW as long as the wheel speed $V_{w_1}$ is maintained higher than or equal to the lower vehicle speed reference value ($V_{i_1}-1$ km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $V_{w_1}$ is maintained higher than or equal to the vehicle speed representing value $V_{i_1}-1$ km/h and lower than the higher vehicle speed reference value ($V_{i_1}+1$ km/h). The gate signal of the NOR gate 63 is fed to a timer 64, an OR gate 65 and a shot-pulse generator 66, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration. e.g. 0.4G, to the integrator circuit 73. The analog switch 72 is likewise turned ON in response to the HIGH level selector signal $S_4$ to supply a voltage corresponding to possible minimum wheel acceleration value, e.g. $-1.2$G, to the integrator circuit 73.

The integrator circuit 73 has a per se well known construction and is consisted of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 66 is responsive to an ON-set signal IG of an ignition switch to generate a first shot pulse as the first reset signal for resetting the integrator circuit 73. The shot-pulse generator 66 subsequently generates the shot-pulses serving as the reset signal $S_1$ at every leading edge of the HIGH level NOR gate signal. As set forth above, since the NOR gate signal becomes HIGH when the wheel speed $V_{w_1}$ satisfies ($V_{i_1}-1$ km/h)$\leq V_{w_1} <$($V_{i_1}+1$ km/h), the integrated value of the integrator 73 is reset every occurrence of the wheel speed $V_{w_1}$ in the aforementioned range. The reset signal $S_1$ of the shot-pulse generator 66 is also supplied to a sample hold circuit 77. The sample hold circuit 77 comprises buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $V_{w_1}$ at the occurrence of the reset signal as a sample value $V_s$. The sample hold circuit 77 outputs a sample/hold signal having a value indicative of the sample value $V_s$ to an adder 82. The adder receives the sample/hold signal from the sample hold circuit 77 and integrator signal from the integrator 73. As will be appreciated, the integrator signal has a value indicative of an integrated value $$Ve\left(= \int_0^t (-E)\cdot dt\right).$$

Therefore, the adder 82 adds the integrated value Ve to the sample value $V_s$ to derive the vehicle speed, representing value $V_{i_1}$. The output terminal of the adder 82 is connected to a switching circuit 83. The switching circuit 83 is also directly connected to the wheel speed derivation circuit 31a to be input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $V_{w_1}$ is lower than the $V_{i_1}+1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

Figure 7:
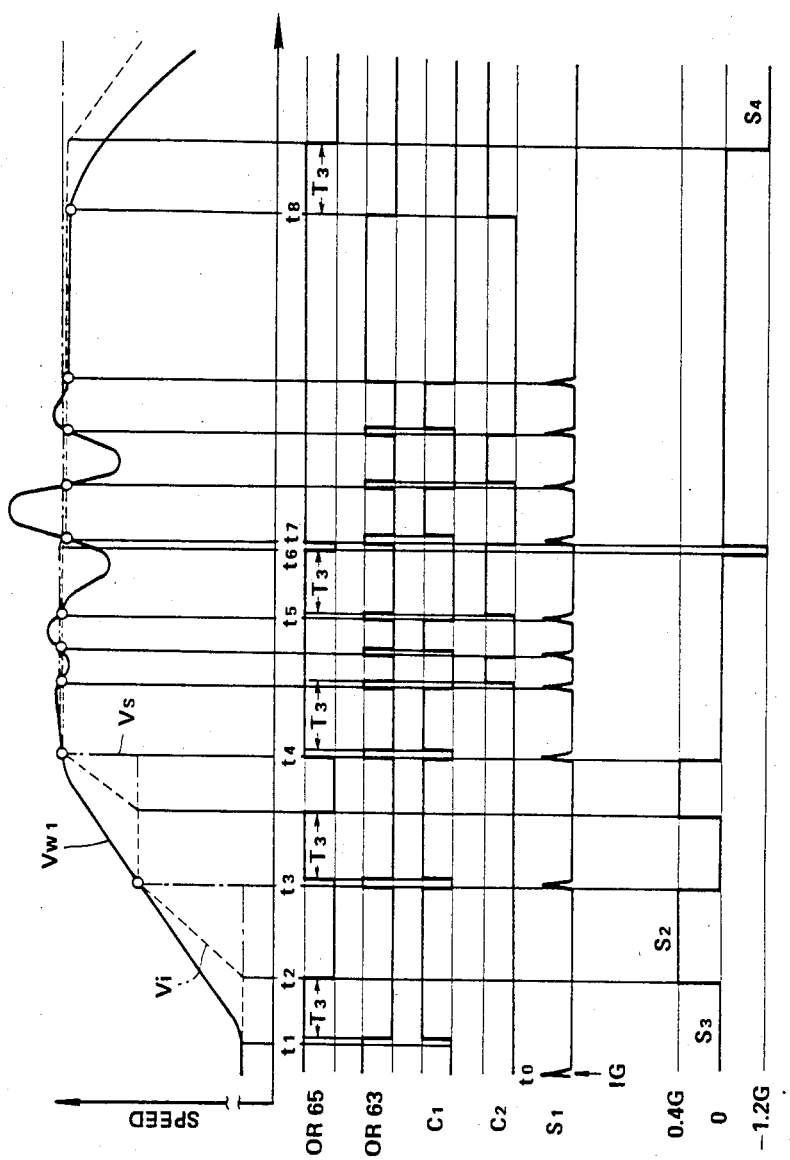
FIG. 7 is a timing chart showing operation of the vehicle speed representing value derivation circuit of FIG. 6.

Operation of the vehicle speed representing derivation circuit 27a will be described herebelow with reference to FIG. 7. In FIG. 7, the operation of the vehicle speed representing value derivation circuit 27a is described in a condition where the gate signal level of the AND gate 84 is maintained LOW level due to absence of the HIGH level pump signal MR or the comparator signal $c_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 7, the engine is started up at a time $t_0$. In response thereto, the On-set signal IG is input to the shot-pulse generator 66. Therefore, the shot pulse $s_1$ is output at the time $t_0$ from the shot-pulse generator 66. With the shot pulse at the time $t_0$, the sample hold circuit 77 is reset. The sample/hold circuit 77 as reset by the shot pulse $s_1$ at the time $t_0$, samples and holds the wheel speed signal value $Vw_1$ as sample value $Vs$. Therefore, after the time $t_0$, the held sample value $Vs$ is output from the sample hold circuit 77 as an initial vehicle speed representing value. At the same time, i.e. at the time $t_0$, the integrator circuit 73 is reset by the reset signal $s_1$. Therefore, the value $Ve$ of the integrator signal of the integrator circuit 73 drops to zero. As a result, the output value $Vi_1$ from the adder 82 becomes that equal to the held initial vehicle speed representing value $Vs$, as shown by broken line in FIG. 7.

At this time, the comparator signals $c_1$ and $c_2$ of the comparators 59 and 60 are maintained LOW level. Therefore, the NOR gate signal of the NOR gate 63 is maintained HIGH level. Therefore, the gate signal level of the OR gate 65 is maintained HIGH level and the gate signal is fed to the analog switch 67 as the select signal $S_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals $S_2$ and $S_4$ of the AND gates 69 and 70 are held LOW to maintain the analog switches 71 and 72 at OFF position. Since the analog switch 67 serves to maintain the input level at the inverting input terminal of the comparator 74 in the integrator circuit 73 zero, the integrated value of the integrator circuit 73 is maintained zero. As a consequence, the output value of the adder 82 as the vehicle speed representing value $Vi$ is maintained at the equal value to the initial vehicle speed representing value as the sample value $Vs$.

After the vehicle starts running, the wheel speed $Vw$ becomes greater than or equal to $Vi_1+1$ km/h, at a time $t_1$. In response to this, the comparator signal of the comparator 59 turns HIGH level. By the HIGH level comparator signal $c_1$ from the comparator 59, the gate signal of the NOR gate 63 turns LOW. At this time, since the timer 64 becomes active to output HIGH level timer signal for a period of time $T_3$, the gate signal level of the OR gate 65 is maintained HIGH level for the corresponding $T_3$ period. Therefore, the select signal $S_3$ is maintained HIGH level and the selector signals $S_2$ and $S_4$ are held at LOW level. Therefore, even after the vehicle starts running the vehicle speed representing value $Vi_1$ is held at the equal value to the sample value $Vs$ for the $T_3$ period.

After expiration of the $T_3$ period, at a time $t_2$, the gate signal of the OR gate 65 turned into LOW level due to termination of the HIGH level timer signal from the timer 64. Since the comparator signal $c_1$ and the inverted gate signal from the OR gate 65 through the inverter 68 are both becomes HIGH level, the selector signal $S_2$ of the AND gate 69 turns HIGH. At the same time, because of LOW level gate signal of the OR gate 65 is applied to the gate of the analog switch 67 as the select signal $S_3$ to turn the latter OFF. At this time, since the comparator signal from the comparator 60 is maintained LOW level, the AND gate 70 is maintained non-conductive to feed the LOW level select signal $S_4$. Therefore, only analog switch 71 is turned ON to input a value corresponding to wheel acceleration magnitude of 0.4G. This value, e.g. 0.4G serves for defining inclination of the vehicle speed representing value $Vi_1$. The integrator circuit 73 thus receives the value (0.4G) through the analog switch 71 to output the integrator signal having a value $Ve$ as set forth above. Therefore, the output value of the adder 82 increases from time-to-time as increasing of the integrator signal value $Ve$.

At a time $t_3$, the vehicle speed representing value $Vi_1$ ($=Vs+Ve$) reaches a value to establish $Vw_1 < Vi_1+1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset. At the same time, the instantaneous wheel speed $Vw_1$ at the time $t_3$ is sampled and held in the sample hold circuit 77 as the renewed sample value $Vs$. By renewing the sample value $Vs$, the vehicle speed representing value $Vi_1$ becomes equal to the instantaneous wheel speed value $Vw_1$ and thus establishes $Vw_1 \geq Vi+1$ km/h. Therefore, the comparator signal $c_1$ again turns ON at the time $t_3$. Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value $Vs$ by the instantaneous wheel speed $Vi_1$ at the time $t_4$. After the time $t_4$, the sampled value $Vs$ is maintained constant for the given period $T_3$ by the HIGH level timer signal of the timer 64. Before the HIGH level timer signal terminates, the shot pulse as the reset signal is generated by the shot pulse generator 66, as shown in FIG. 7. While the interval of the shot pulse of the shot pulse generator 66 is shorter than the timer period $t_3$. the integrated value of the integrator 73 is maintained zero. Therefore, the adder outputs the sampled value $Vs$ as the vehicle speed representing value $Vi_1$. After a time $t_5$, at which the reset signal $s_1$ is produced for resetting the sample hold circuit 77 and the integrator 73, the gate signal of the OR gate turns LOW at a time $t_6$ after expiration of the timer period $T_3$. During the period between the times $t_5$ and $t_6$, the wheel speed $Vw_1$ drops to be lower than ($Vi_1-1$ km/h). Since the wheel speed $Vw_1$ is maintained lower than the value ($Vi_1-1$ km/h) at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, a value corresponding to a predetermined deceleration magnitude of −1.2G is input through the analog switch 72. Consequently, the integrated value in the integrator 73 becomes negative. The negative integrated value is summed with the sample value Vs which corresponds to the instantaneous wheel speed $Vw_1$ at a time $t_5$ to gradually reduce the value of the vehicle speed representing value $Vi_1$. At a time $t_7$, the wheel speed $Vw_1$ is increaseed across the value $(Vi_1+1$ km/h). As a result, the reset signal $s_1$ is generated by the shot pulse generator 66. Then sample hold circuit 77 and the integrator 73 are thus reset.

At a time $t_8$, braking operation is initiated to abruptly decelerate the vehicle. As a result, the wheel speed $Vw_1$ drops across the value of $(Vi_1-1$ km/h). By this, the comparator signal $c_2$ of the comparator rises to HIGH level to destroy the NOR condition at the NOR gate 63. Therefore, the NOR gate signal of the NOR gate turns into LOW level. The timer 64 is thus triggered by the trailing edge of the HIGH level NOR gate signal to output HIGH level timer signal for the timer period $t_3$. After expiration of the timer period $T_3$, the value corresponding to the deceleration magnitude of −1.2G is input to the integrator. Therefore, the vehicle speed representing value $Vi_1$ is gradually decreased.

Figure 8:
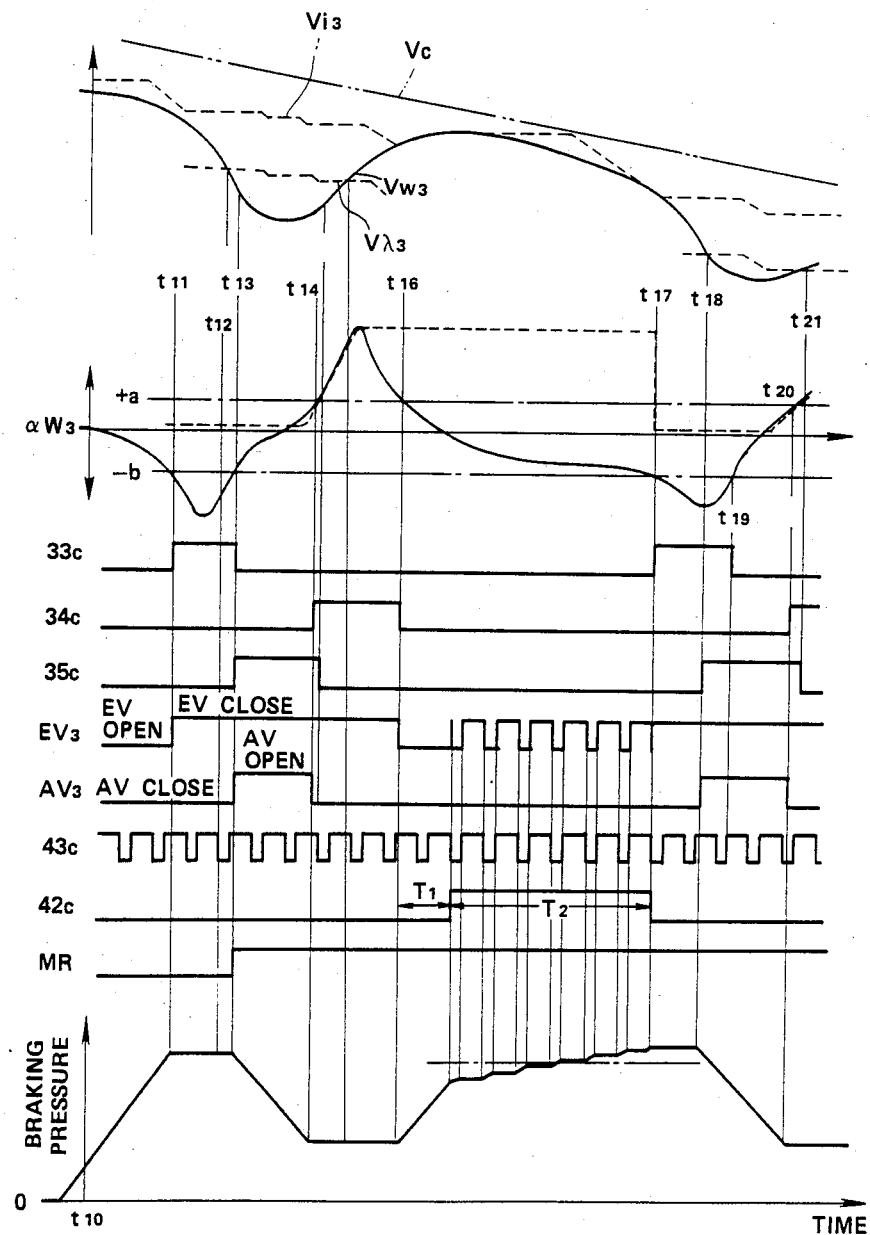
FIG. 8 is a timing chart showing operation of the anti-skid brake control to be performed by the wheel slip control system of FIG. 1 for controlling braking pressure for rear wheels.

FIG. 8 shows a timing chart of the operation of the controller circuit section 18c in anti-skid brake control for the rear wheels.

It is assumed that vehicular brake is applied for deceleration of the vehicle at a time $t_{10}$, hydraulic braking pressure is built up and distributed to all of the wheel cylinders 1a, 2a, 3a and 4a in common. According to the increasing of the braking pressure in the wheel cylinders 3a and 4a, the rear wheels 3 and 4 are decelerated.

At a time $t_{11}$, the wheel acceleration $aw_3$ decreases across the wheel deceleration threshold −b. This results in initiation of anti-skid brake control. Namely, since the wheel acceleration $aw_3$ becomes smaller than the wheel deceleration threshold −b, the comparator signal of the comparator 33c turns into HIGH level. This turns the gate signals of the OR gates 36c, 40c and 40d into HIGH level. Therefore, the inlet control signal $EV_3$ output through the amplifier 37c turns HIGH level. Therefore, both of the EV valves 19c and 19d are shut at the time $t_{11}$. At this time, since the output of the AND gate 38c is held LOW level, the outlet control signal $AV_3$ is held LOW. Therefore, the AV valves 20c and 20d are also maintained at closed position. Therefore, the anti-skid brake control valve assemblies 17c and 17d are placed in HOLD mode position. The braking pressure in the wheel cylinders 3a and 4a are thus held constant at the pressure level at the time $t_{11}$.

For the initial cycle of the anti-skid brake control, the vehicle speed representing value Vi is derived by the vehicle speed representing value derivation system 27. Based on the common vehicle speed representing value Vi, the target wheel speed $V\lambda_3$ is derived at a value 85% of Vi. As described above, since the vehicle speed representing value decreases according to the integrated value of the integrator 73, the target wheel speed $V\lambda_3$ decreases continuously. At a time $t_{12}$, the lower rear wheel speed $Vw_R$ decelerated across the target wheel speed $V\lambda_3$. Then, the comparator signal of the comparator 35c turns into HIGH level. At this time, since comparator signal of the comparator 34c is held LOW to apply HIGH level input to the AND gate 38c through the inverting input terminal, AND condition is established at the AND gate 38c. Therefore, the gate signal of the AND gate 38c turns into HIGH level to cause HIGH level outlet control signal $AV_3$. This operates the anti-skid brake control valve assemblies 17c and 17d into the RELEASE mode position. Therefore, the braking pressure in the wheel cylinders 3a and 4a are released by feeding back the pressurized braking fluid to the pressure accumulators 22c and 22d. At the same time, by the HIGH level outlet control signal $AV_3$, the retriggerable timer 30 is triggered to start outputting of the pump drive signal MR. Therefore, the pump motor 24 is started to drive the fluid pumps 21c and 21d.

By decreasing the braking pressure in the wheel cylinders 3a and 4a, the wheel speed $Vw_3$ are resumed and therefore wheel acceleration $aw_3$ is increased. The wheel acceleration $\alpha w_3$ increases across the wheel deceleration threshold −b at a time $t_{13}$. Therefore, the comparator signal of the comparator 33c turns into LOW level at the time $t_{13}$. However, at this time, since the HIGH level comparator signal is input to the OR gate 36 is maintained HIGH level. Therefore, the gate signal of the OR gate 40c is held HIGH to maintain the inlet control signal $EV_3$ at HIGH level. Therefore, the anti-skid control valve assemblies 17c and 17d are maintained at the RELEASE mode, at the time $t_{13}$. Thus, the wheel speeds $Vw_3$ are continued to increase. Accordingly, the wheel acceleration $\alpha w_3$ increases. At a time $t_{14}$, the wheel acceleration $\alpha w_3$ increases across the wheel acceleration threshold +a. This results in HIGH level comparator signal of the comparator 34c. This HIGH level comparator signal of the comparator 34c turns the input level at the inverting input terminal of the AND gate 38c into LOW level. Therefore, the AND gate signal of the AND gate 38c turns into LOW level. Therefore, the outlet control signal $AV_3$ turns into LOW level to close the AV valves 20c and 20d in the anti-skid brake control valve assemblies 17c and 17d. As a result, the anti-skid brake control valve assemblies 17c and 17d are again placed into the HOLD mode to maintain the braking pressure level constant at the pressure level at the time $t_{14}$. By holding the braking pressure at decreased level, the wheel speed $Vw_3$ still increases. Also, according to increasing of the wheel speed, wheel acceleration $aw_3$ increases toward the peak $aw_{max}$. As seen from FIG. 8, the rear wheel speed $Vw_3$ increases across the target wheel speed $V\lambda_3$ at a time $t_{15}$. This results in LOW level comparator signal of the comparator 35c. After this, at a time $_{16}$, the wheel acceleration $aw_3$ drops across the wheel acceleration threshold +a. In response to drop of the wheel acceleration $aw_3$ across the wheel acceleration threshold +a, the comparator signal of the comparator 34c turns into LOW level. Therefore, all of the inputs to the OR gate 36c becomes LOW level. Therefore, the OR gate signal of the OR gate 36c turns into LOW level to cause LOW level inlet control signal $EV_3$ at the time $t_{16}$. At the same time, the variable timer 42c is activated by the trailing edge of the HIGH level comparator signal of the comparator 34c to output HIGH level timer signal for a period $T_2$ after a delay time $T_1$ which is variable depending upon the wheel acceleration peak value as latched by the peak hold circuit 44c. During the period $T_2$, the oscillator 43c is triggered to output constant pulse signals. As will be appreciated, while the pulse signal is maintained ON (HIGH) level, AND conditions are established in the AND gate 41c to maintain the inlet control signal $EV_3$ at HIGH level. Therefore, during the delay time $T_1$, the anti-skid brake control valves 17c and 17d are held in APPLICATION mode to increase the braking pressure. On the other hand, during the period $T_2$, the operation mode of the antiskid brake control valves 17c and 17d are alternated between APPLICATION mode and HOLD mode repeatedly.

At a time $t_{17}$, the wheel acceleration $\alpha w_3$ drops across the wheel deceleration threshold $-b$. Therefore, another cycle of anti-skid brake control is initiated. At the same time, the peak hold circuit 44c is reset by the leading edge of the HIGH level comparator signal of the comparator 33c. Thereafter, one skid cycle of anti-skid brake control operation is performed during the period $t_{17}$ to $t_{22}$.

As will be appreciated herefrom, the anti-skid brake control to be taken place for releasing the braking pressure in both of the rear wheel cylinders in response to decreasing of the lower rear wheel speed $Vw_R$ across the target wheel speed $V\lambda_3$ in synchronism with each other and at the same rate. On the other hand, in the APPLICATION mode, the braking pressures in the rear wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value $Vi_3$ at the value precisely reflecting the vehicle speed to allow precise control for the brake.

On the other hand, according to the shown embodiment of anti-skid brake control, synchronous locking of the right-front and left-front wheels 3 and 4 are prevented by means of the synchronous locking detector circuit. Operation of the anti-skid brake control for the front wheels are described hereinbelow with reference to FIG. 9.

Similarly to the anti-skid brake control operation for the rear wheels 3 and 4, anti-skid brake control for the front wheels 1 and 2 are performed through the period of $t_{10}$ to $t_{12}$. At the time $t_{12}$, the wheel speeds $Vw_1$ and $Vw_2$ of the right-front wheel 1 and the left-front wheel 2 drops across the target wheel speed $V\lambda_1$ and $V\lambda_2$ which are derived on the vehicle speed representing value Vi. Therefore, the comparator signals of the comparators 35a and 35b turn into HIGH level, at the time $t_{12}$. In response to the HIGH level comparator signals of the comparators 35a and 35b, the outlet control signals $AV_1$ and $AV_2$ turn into HIGH level to open the AV valves 20a and 20b of the anti-skid brake control valves 17a and 17b. In response to the leading edge of the HIGH level comparator signals of the comparators 35a and 35b, the retriggerable timer 30 is triggered to output the pump drive signal MR.

After this, the wheel speeds $Vw_1$ and $Vw_2$ are resumed by decreasing of the braking pressures in the wheel cylinders 1a and 2a. At a time $t_{13}$, the wheel acceleration $\alpha w_1$ increases across the wheel deceleration threshold $-b$, and subsequently, at the time $t_{14}$, the wheel acceleration $\alpha w_1$ increases across the wheel acceleration threshold $+a$. By increasing the wheel acceleration across the wheel acceleration threshold $+a$, the comparator signal levels of the comparators 34a and 34b turn into HIGH level. At a time $t_{15}$, the wheel speed $Vw_1$ increases across the target wheel speed $V\lambda_1$ to turn the comparator signal level of the comparator 35a into LOW level. At this time, the wheel speed $Vw_2$ of the left-front wheel 2 is still maintained lower than the target wheel speed $V\lambda_2$. Therefore, the comparator signal level of the comparator 35b is maintained HIGH control valve 17a is operated into HOLD mode, and whereas the anti-skid brake control valve 17b is maintained in RELEASE mode to further decrease the braking pressure in the wheel cylinder 2a. At a time $t_{15'}$, the wheel speed $Vw_2$ decreases across the target wheel speed $V\lambda_2$. Therefore, the comparator signal of the comparator 35b turns into LOW level to operate the anti-skid brake control valve 17b into the HOLD mode.

Therefore, as will be appreciated, at the time $t_{15'}$, the braking pressure level in the wheel cylinder 2a is lower than that in the wheel cylinder 1a.

After the time $t_{15}$, the wheel acceleration $\alpha w_1$ reaches the peak. The peak value is held by the peak hold circuits 44a and 44b. Therefore, the input level at the inverting input terminals of the comparators 93a and 93b are increased to $\frac{3}{4}$ of the held peak value $\alpha w_{max}$.

Figure 9:
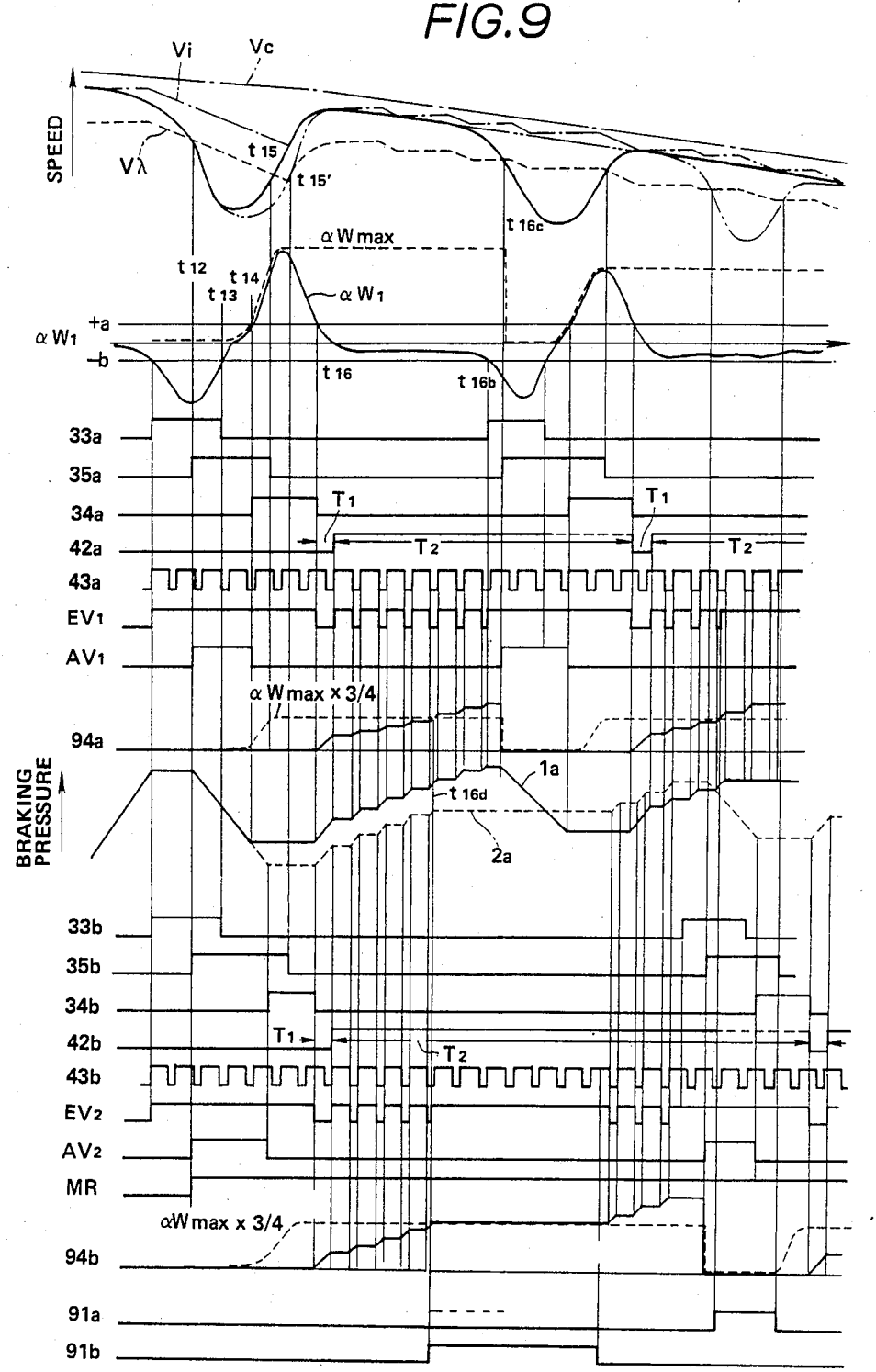
FIG. 9 is a timing chart showing operation of the anti-skid brake control to be performed by the wheel.

As seen from FIG. 9, the peak value $\alpha w_{max}$ as held in the peak hold circuits 44a and 44b are different from each other. Namely, in the shown example, the peak value $\alpha w_{max}$ held in the peak hold circuit 44a is smaller than that of the peak hold circuit 44b.

At a time $t_{16}$, the wheel acceleration $\alpha w_1$ decreases across the wheel acceleration threshold $+a$. As a result, the anti-skid brake control valves 17a and 17b are operated into APPLICATION mode to increase the braking pressure in the wheel cylinders 1a and 2a in stepwise fashion by alternating the anti skid brake control valve positions between APPLICATION mode position and HOLD mode position. During this period, the LOW level OR gates signals of the OR gates 40a and 40b are applied to the input terminal of the counters 94a and 94b. Therefore, the counters 94a and 94b integrate a predetermined unit value to produce counter signals. The counter values of the counters 94a and 94b are compared with the $\frac{3}{4}$ of the peak values $\alpha w_{max}$ in the comparators 93a and 93b. The counter values of the counters 94a and 94b reaches the $\frac{3}{4} \times \alpha w_{max}$ values at a time $t_{16}$. Therefore, the comparator signals of the comparators 93a and 93b turns into HIGH level.

At the time $t_{16}$, the inputs for the AND gate 92a from the inverters 97 and 98a are held HIGH level and the input for the AND gate 92b from the inverter 98b is held HIGH level. However, since the inverted input from the inverter 97 turns LOW level, the AND gate 92a is held the gate signal level at LOW level. Therefore, only flip-flop 91b is set to output the HIGH level set signal. The HIGH level set signal of the flip-flop 91b is fed to the input terminal of the OR gate 90b to maintain the gate signal of the OR gate 90b at HIGH level. As a result, the inlet control signal $EV_2$ for the anti-skid brake control valve 17b is maintained HIGH level.

On the other hand, since the gate signal of the AND gate 92a is maintained at LOW level as set forth above, the set signal of the flip-flop 91a is maintained LOW level to allow altering of the gate signal of the AND gate 41a between HIGH and LOW levels to alternate the inlet control signal between HIGH and LOW levels to increase the braking pressure in the wheel cylinder 1a in stepwise fashion.

As will be seen from FIG. 9, by continuing increasing of the braking pressure, the wheel speed $Vw_1$ is decreased and the wheel acceleration $\alpha w_1$ drops across the wheel deceleration threshold $-b$ to turn the comparator signal of the comparator 33a into HIGH level, at a time $t_{16b}$. Subsequently, the wheel speed $Vw_1$ decreases across the target wheel speed $V\lambda_1$ to turn the comparator signal of the comparator 35a into HIGH level. By the HIGH level comparator signal of the comparator 35a, the shot-pulse generator 95a is triggered to output the reset signal. By the reset signal, the counter 94a and the flip-flop 91a are reset. Therefore, the comparator signal of the comparator 93a turns into LOW level to turn the gate signal of the ABD gate 92a into LOW level.

During this period, the braking pressure in the wheel cylinder 2a is maintained at a constant level. Therefore, the wheel speed is resumed across the target wheel speed $V\lambda_2$ to cause HIGH level comparator signal of the comparator 35b, at a time $t_{16c}$. In response to the HIGH level comparator signal of the comparator 35b, the counter 94b and the flip-flop 91b are reset. Therefore, the gate signal of the OR gate 90b alternatively varies between HIGH and LOW levels for resuming increasing of the braking pressure, at the time $t_{16c}$.

At a time $t_{16d}$, the counter value of the counter 94a reaches the $\frac{3}{4} \times \alpha w_{max}$ to turn the comparator signal of the comparator 93a into HIGH level. At this time, since the gate signal of the AND gate 92b is maintained LOW level, the AND gate becomes conductive by the HIGH level input from the inverters 98a and 97 and the HIGH level comparator signal from the comparator 93a. Therefore, the flip-flop 91a is set to output the HIGH level set signal to the OR gate 90a to maintain the inlet control signal $EV_1$ at HIGH level. The flip-flop 91a is maintained at set condition until it is reset by the reset pulse of the shot-pulse generator 95b produced in response to the trailing edge of the HIGH level comparator signal from the comparator 35b.

As will be appreciated herefrom, the synchronous locking at the front wheels are successfully prevented.

Figure 10:
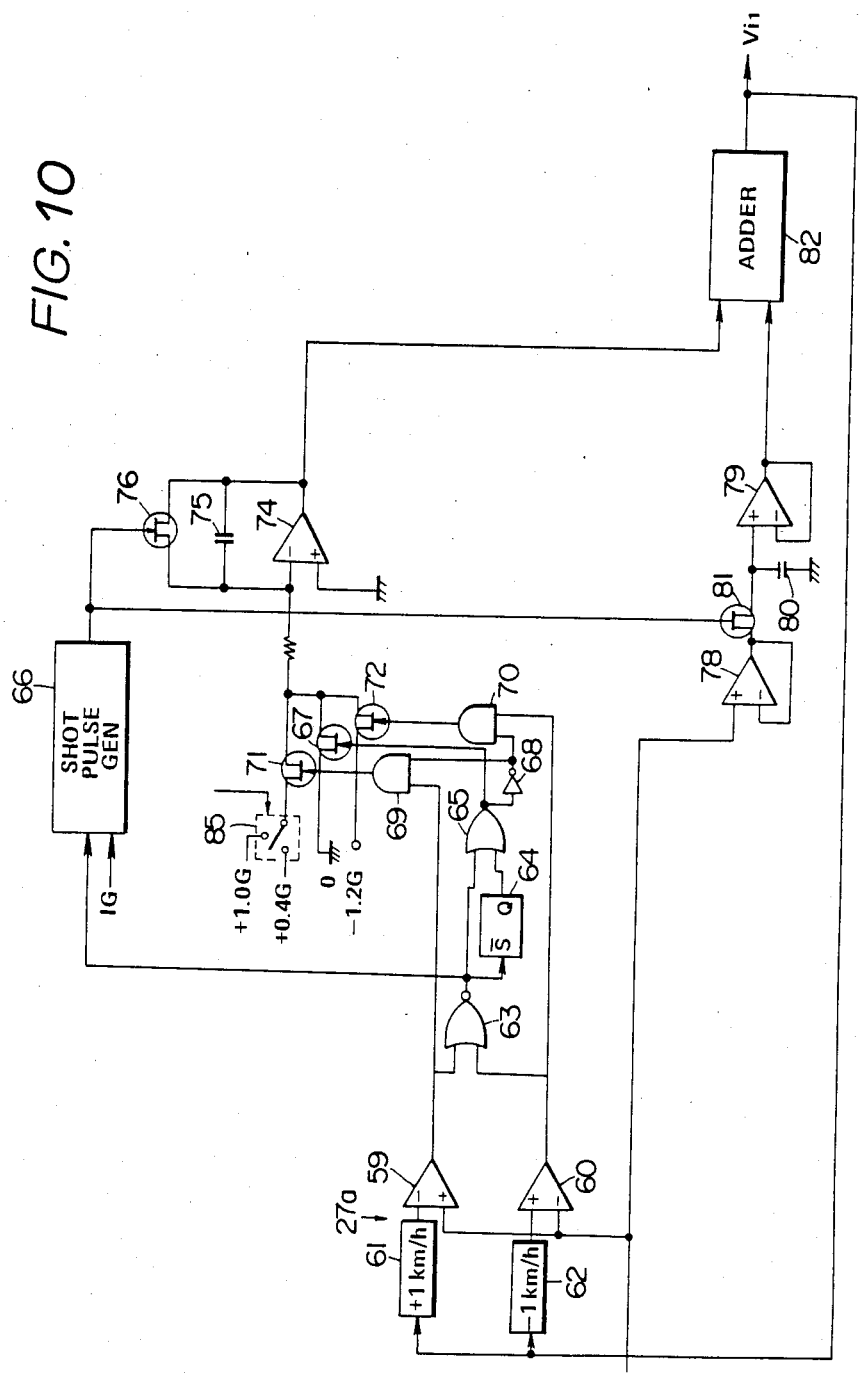
FIG. 10 is a block diagram of the modified embodiment of the vehicle speed representing valve derivation circuit to be employed in the anti-skid brake control system of FIG. 1.

For instance. FIG. 10 shows a modification of the aforementioned vehicle speed representing value derivation circuit 27a, 27b, 27c and 27d. In this modified embodiment, the wheel acceleration indicative value to be introduced to the integrator 73 is variable between +1.0G and +0.4G through the analog switch 71. For selectively introducing the +0.4G value and +10G value, a selector switch 85 is provided. The selector switch 85 is normally in a position to pass the +0.4G value to the integrator 73 and is responsive to HIGH level pump drive signal MR to turn the switch position to pass the +1.0G value. In the modification, the switch 83 is neglected.

In the alternative embodiment, the shot-pulse generators 95a and 95b may be triggered to reset the flip-flops 91a and 91b by the leading edge of the HIGH level comparator signals of the comparator 35a and 35b. The modified anti-skid control operation with synchronous locking preventing feature will be seen from FIG. 11 As will be seen from FIG. 11, since the flip-flops 91a and 91b are reset by the reset pulses generated in response to the leading edge of the HIGH level comparator signal of the comparator 35a and 35b at earlier timing. Therefore, the braking pressures to be built-up in the wheel cylinders 1a and 2a can be maintained higher than that in the former embodiment.

Figure 12A:
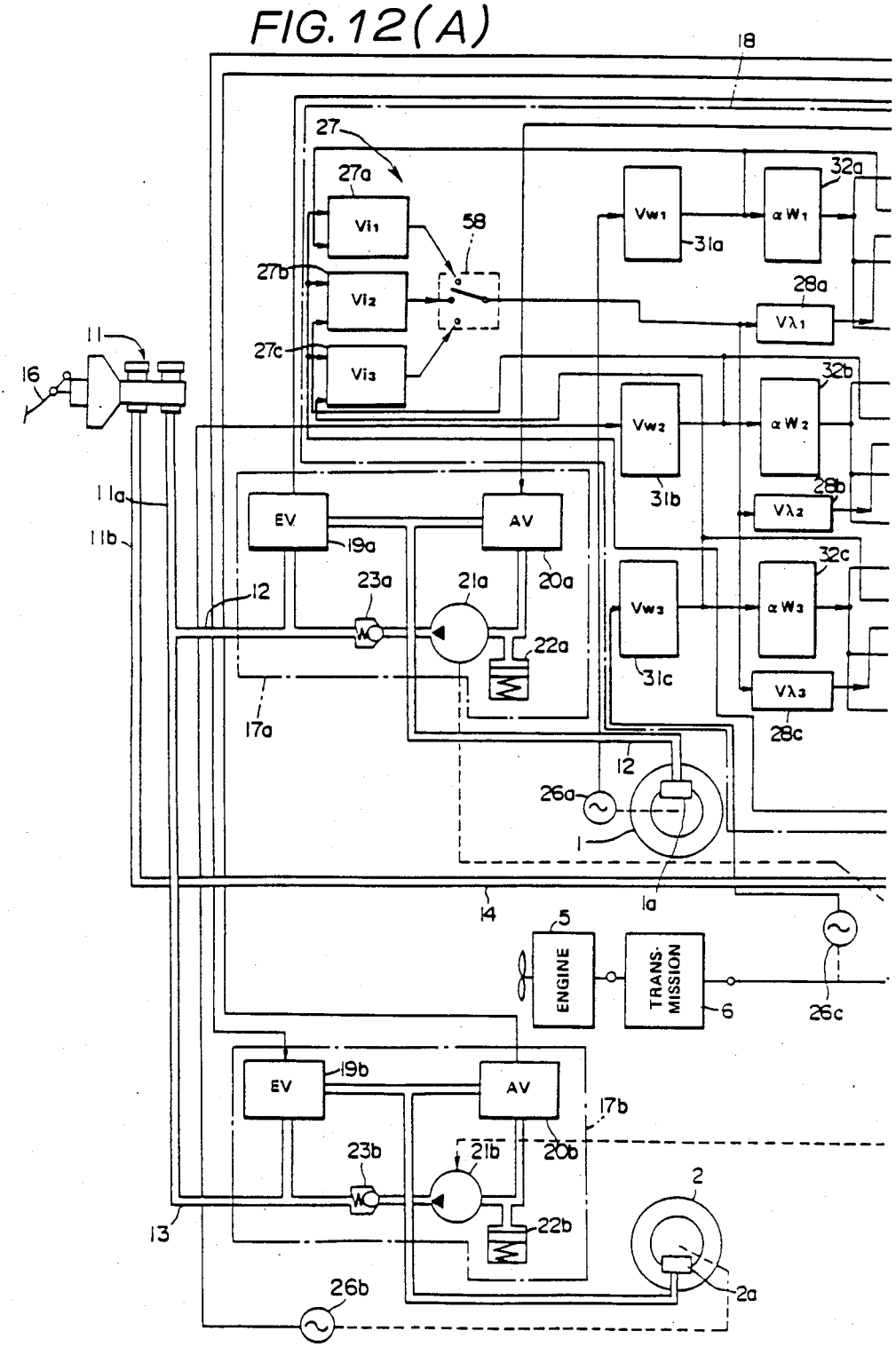
FIGS. 12(A) and 12(B) are block diagrams of another embodiment of the preferred embodiment of the vehicle speed representing value derivation circuit of the invention.
Figure 12B:
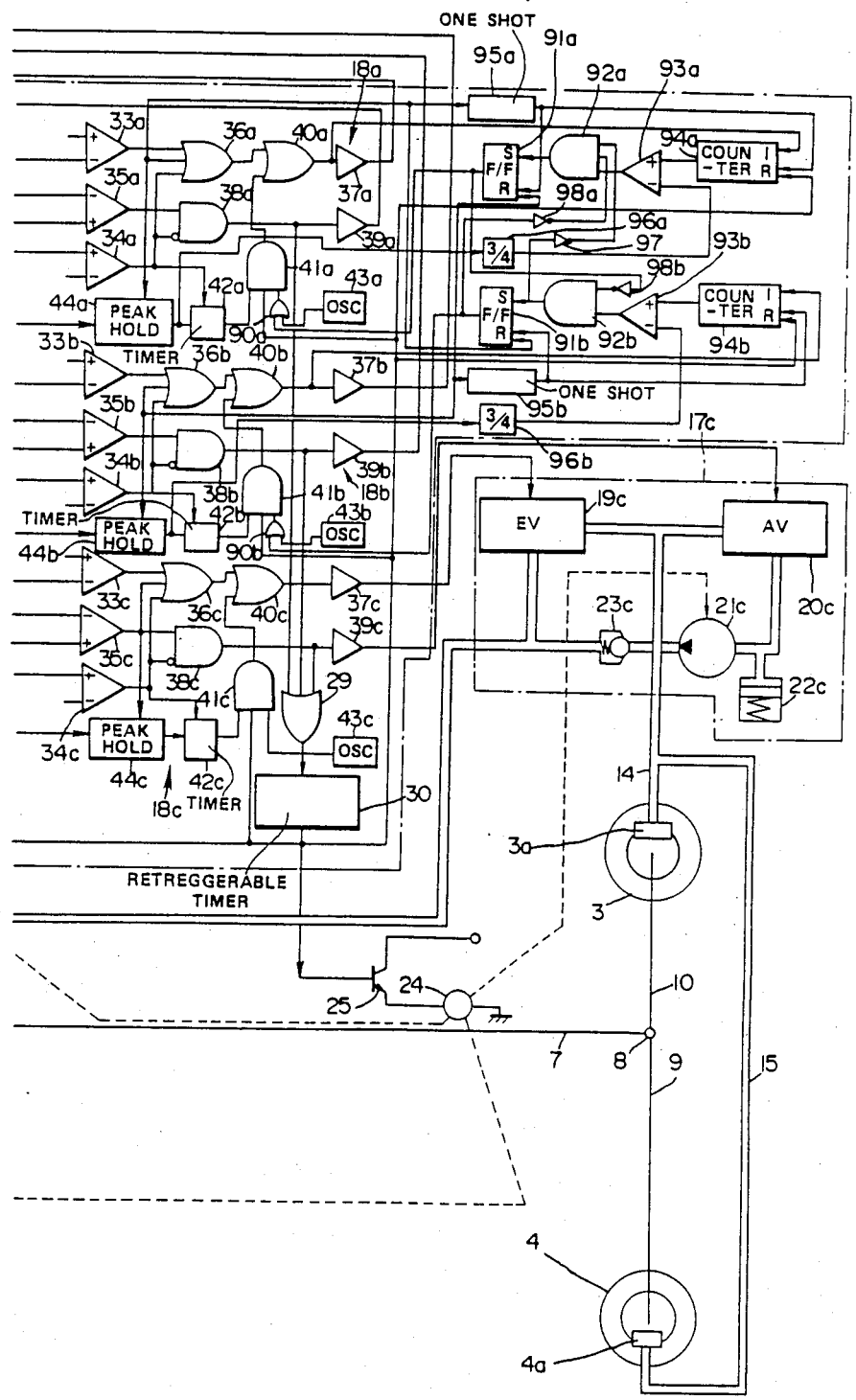
Figure 13:
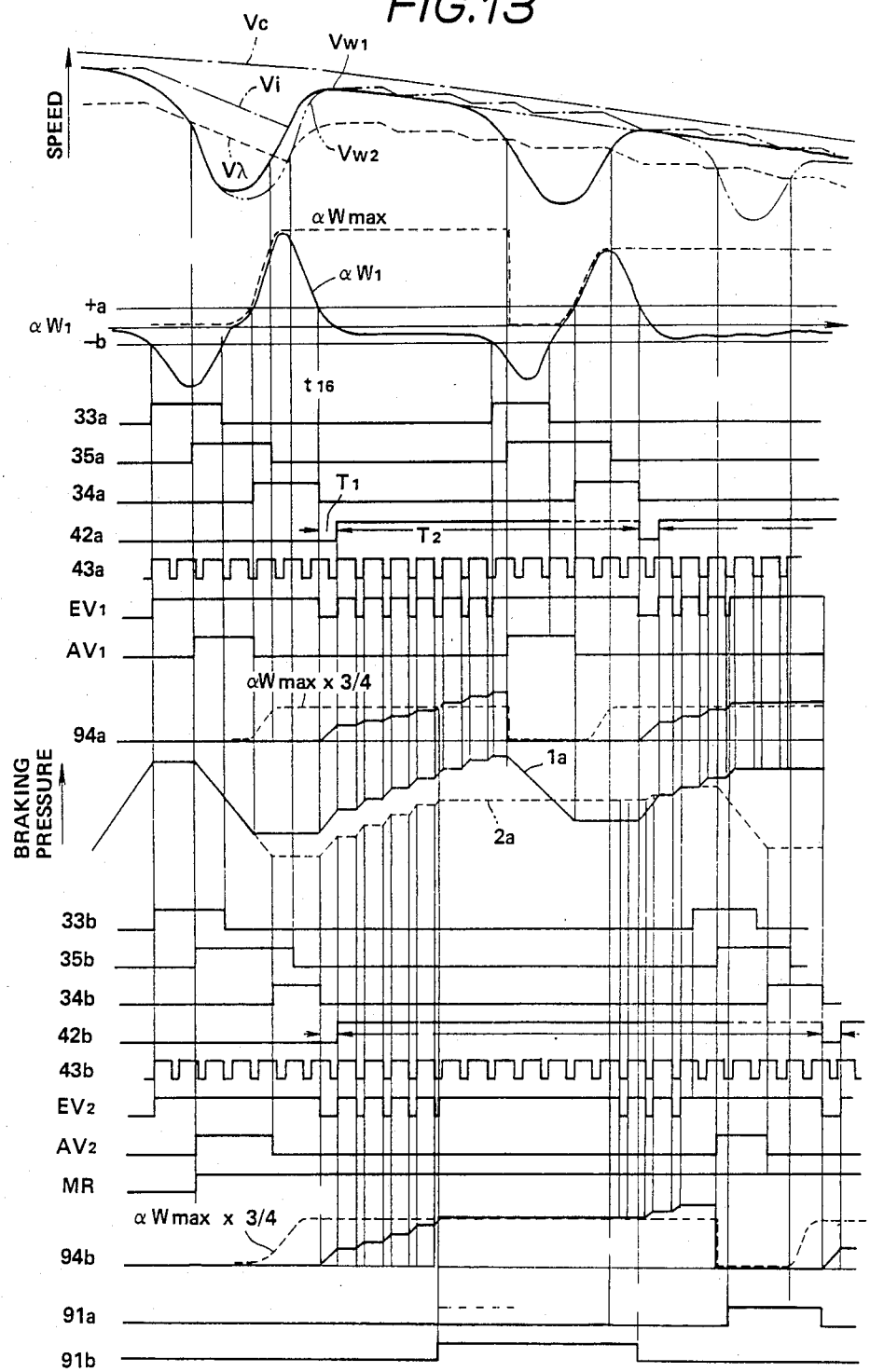
FIG. 13 is a timing chart showing operation to be performed by the anti-skid brake control system of FIG. 12.
Figure 14:
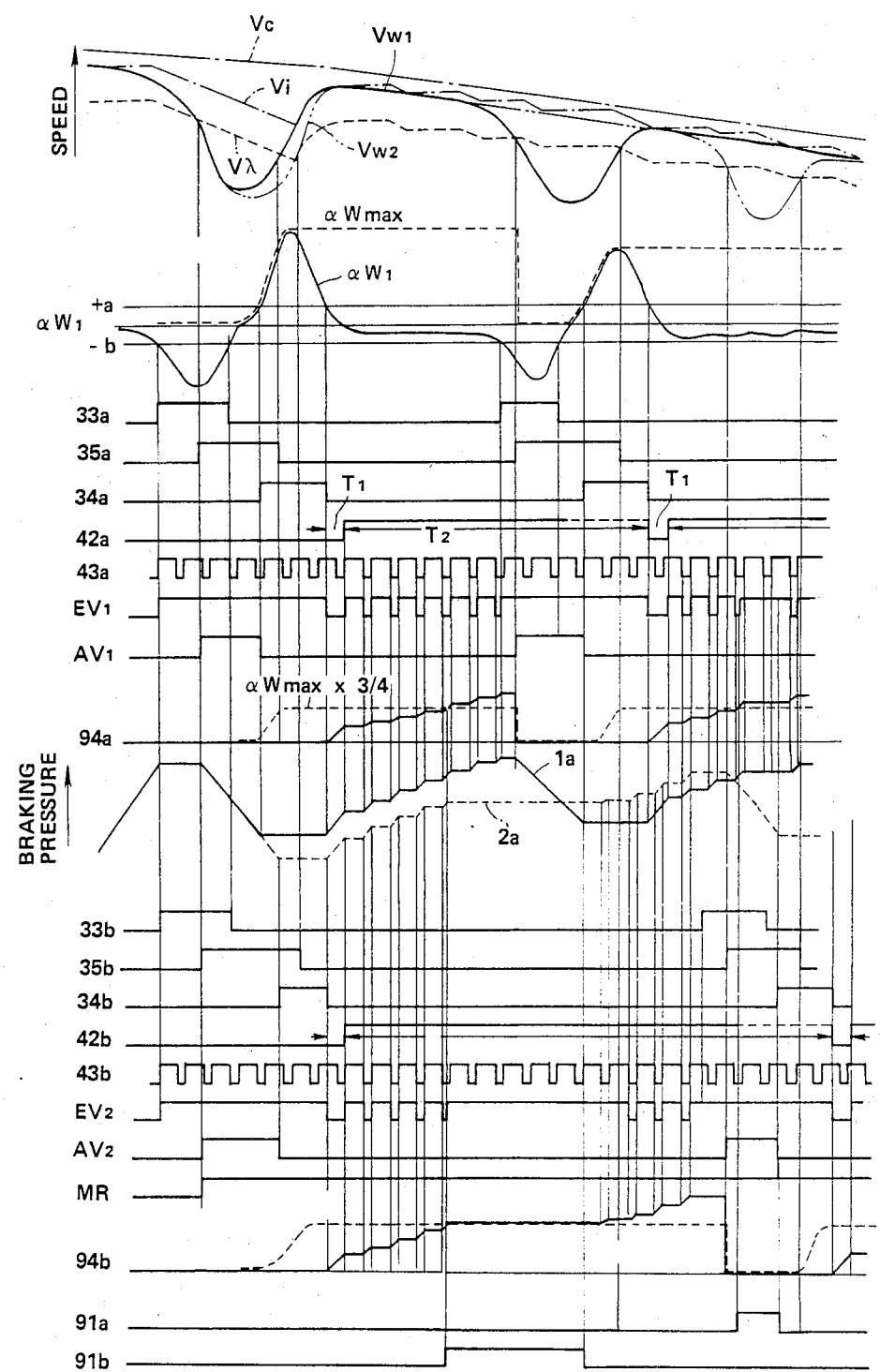
FIG. 14 is a timing chart showing modified operation to be performed by the anti-skid brake control system of FIG. 12

FIG. 12 shows a modified embodiment of the anti-skid brake control system according to the invention. In this embodiment, the shot-pulse generators 95a and 95bb are connected to the output terminals of the comparators 34a and 34b. The shot-pulse generator 95a and 95b are triggered by the trailing edges of the HIGH level comparator signals of the comparator 34a and 34b. The timing chart of this modified embodiment is shown in FIG. 13. FIG. 14 is a timing chart of a further modification of the embodiment of FIG. 12. In the modification, the shot-pulse generators 95a and 95b are triggered by the leading edges of the HIGH level comparator signals of the comparators 34a and 34b. In this case, substantially the same simultaneous locking preventing effect can be achieved.

Figure 11:
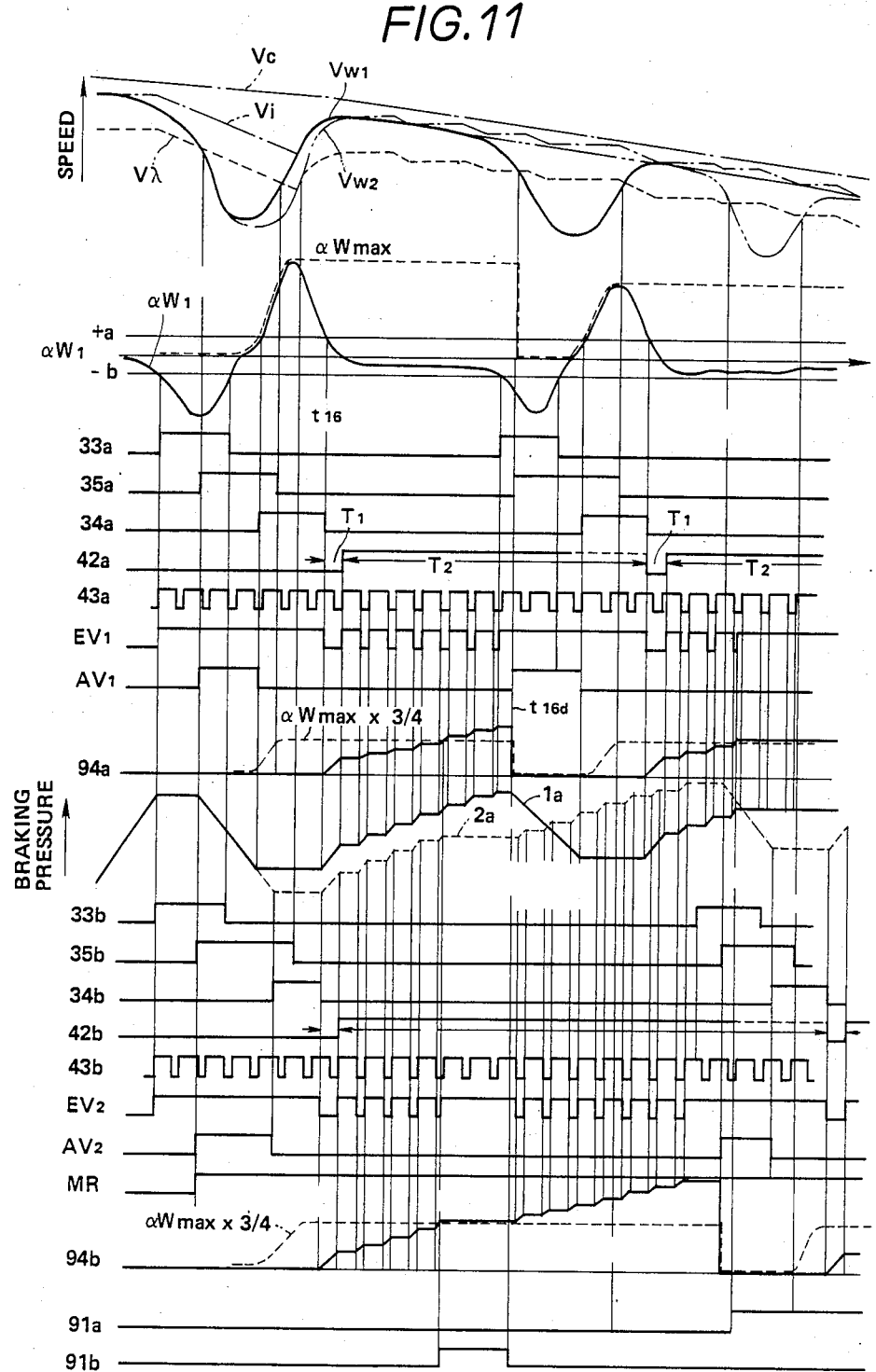
FIG. 11 is a timing chart showing modified operation to be performed by the anti-skid brake control system of FIG. 1.

It should be noted that, in the timing charts of FIGS. 11, 13 and 14, the corresponding operation timing to that in FIG. 9 are represented by the same references.

Therefore, simultaneous locking of the front wheels can be successfully avoided.

What is claimed is:

1. An anti-skid brake control system for an automotive vehicle comprising:

a hydraulic brake circuit including a plurality of wheel cylinders for establishing braking pressure for decelerating vehicular wheels;

first and second anti-skid brake control valves, each associated at least one of first and second wheel cylinders associated with first and second wheels for adjusting braking pressure therein, each of said anti-skid brake control valves being operable to increase braking pressure in the associated wheel cylinder in a first mode position, and to decrease the braking pressure in the associated wheel cylinder in a second mode position;

first sensor for monitoring rotation speed of said first wheel for producing a first wheel speed indicative signal;

second sensor for monitoring rotation speed of said second wheel for producing a second wheel speed indicative signal;

first means for deriving first control signal for controlling position of said first anti-skid brake control valve based on said first wheel speed indicative signal between said first and second mode positions;

second means for deriving second control signal for controlling position of said second anti-skid brake control valve based on said second wheel speed indicative signal; and third means for detecting synchronous operation of said first and second anti-skid brake control valves to produce a third control signal for disabling one of said first and second means to operate associated one of said first and second anti-skid brake control valves in said first mode position and to allow the other of said first and second means to operate the associated one of first and second anti-skid brake control values into said first mode position, said third means holding said one of first and second means in the disabled state until braking condition of one of the wheels to be controlled by the other of said first and second anti-skid brake control values satisfies a predetermined condition which reflects non-locking state of said one wheel.

2. An anti-skid brake control system as set forth in claim 1, wherein said anti-skid brake control valves are further operable to hold the braking pressure in said first and second wheel cylinders constant in third mode position.

3. An anti-skid brake control system as set forth in claim 2, wherein said first and second means alternatively switch the mode positions of said first and second anti-skid brake control valves between said first and third mode positions so as to increase said braking pressure in said first and second wheel cylinders in stepwise fashion.

4. An anti-skid brake control system as set forth in claim 3, wherein said third means includes first counter for incrementing a first counter value by a value proportional to a period of time to maintain said first anti-skid brake control valve at said first mode position and a second counter for increasing a second counter value by a value proportional to a period of time to maintain said second anti-skid brake control valve at said first mode position, and detector for detecting synchronously increasing of braking pressure in said first and second wheel cylinders by comparing a difference of said first and second counter values of said first and second counters with a given value.

5. An anti-skid brake control system as set forth in claim 4, which further comprises first arithmetic means for deriving first wheel acceleration based on said first wheel speed indicative signal to produce a first wheel acceleration indicative signal, a second arithmetic circuit for deriving second wheel acceleration based on said second wheel speed indicative signal value to produce a second wheel acceleration indicative signal, a first peak hold circuit for holding peak value of said first wheel acceleration indicative signal in each skid cycle, and a second peak hold circuit for holding peak value of said second wheel speed indicative signal in each skid cycle.

6. An anti-skid brake control system as set forth in claim 5, wherein said third means further includes a first comparator for comparing said first counter value with a first reference value derived based on said peak value for producing a first comparator signal when said first counter value is greater than or equal to said first reference value, and a second comparator for comparing said second counter value with a second reference value derived based on said peak value for producing a second comparator signal when said second counter value is greater than or equal to said second reference value, and said third means is responsive to said first and second comparator signals under the presence of said detector signal to control operation of said first and second anti-skid brake control values with delay time.

* * * * *